US008990912B2

(12) United States Patent
Baentsch et al.

(10) Patent No.: US 8,990,912 B2
(45) Date of Patent: Mar. 24, 2015

(54) AUTHENTICATION OF DATA COMMUNICATIONS

(75) Inventors: Michael Baentsch, Gross (CH); Peter Buhler, Horgen (CH); Thomas Eirich, Waedenswil (CH); Thorsten Kramp, Kilchberg (CH); Michael Peter Kuyper-Hammond, Kaltbrunn (CH); Michael Charles Osborne, Richterswil (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1686 days.

(21) Appl. No.: 12/425,805

(22) Filed: Apr. 17, 2009

(65) Prior Publication Data

US 2009/0265776 A1    Oct. 22, 2009

(30) Foreign Application Priority Data

Apr. 18, 2008    (EP) .................................... 08103620

(51) Int. Cl.
  *G06F 7/04*    (2006.01)
  *G06F 15/16*    (2006.01)
  (Continued)

(52) U.S. Cl.
  CPC ............. *H04L 63/08* (2013.01); *H04W 8/245* (2013.01); *G06F 21/34* (2013.01); *H04L 63/0853* (2013.01); *H04L 63/18* (2013.01); *H04W 12/06* (2013.01); *H04W 88/02* (2013.01)
  USPC .......................................................... 726/9

(58) Field of Classification Search
  CPC ....... H04W 12/06; H04W 8/245; G06F 21/34
  USPC .......................................................... 726/9
  See application file for complete search history.

(56) References Cited

U.S. PATENT DOCUMENTS

| 7,021,534 | B1 * | 4/2006 | Kiliccote | 235/380 |
| 2002/0023027 | A1 * | 2/2002 | Simonds | 705/26 |

(Continued)

FOREIGN PATENT DOCUMENTS

| EP | 11802155 | 6/2007 |
| WO | WO 2005/116909 | 12/2005 |

OTHER PUBLICATIONS

Hiltgen, "Secure Internet Banking Authentication", IEEE Security & Privacy Magazine, vol. 4, No. 2, Mar. 2006.

*Primary Examiner* — Linglan Edwards
*Assistant Examiner* — Lawrence Cosby
(74) *Attorney, Agent, or Firm* — Ido Tuchman; Jennifer R. Davis

(57) ABSTRACT

Methods and apparatus are provided for authenticating communications between a user computer and a server via a data communications network. A security device has memory containing security data, and security logic to use the security data to generate an authentication response to an authentication message received from the server in use. An interface device communicates with the security device. The interface device has a receiver for receiving from the user computer an authentication output containing the authentication message sent by the server to the user computer in use, and interface logic adapted to extract the authentication message from the authentication output and to send the authentication message to the security device. Includes a communications interface for connecting to the server via a communications channel bypassing the user computer. Either the security device or interface device sends the authentication response to the server via the communications channel bypassing the user computer.

22 Claims, 6 Drawing Sheets

(51) Int. Cl.
*G06F 17/30* (2006.01)
*H04L 29/06* (2006.01)
*H04W 12/06* (2009.01)
*H04W 8/24* (2009.01)
*G06F 21/34* (2013.01)
*H04W 88/02* (2009.01)

(56) References Cited

U.S. PATENT DOCUMENTS

| | | | |
|---|---|---|---|
| 2003/0182242 | A1 | 9/2003 | Scott |
| 2006/0242692 | A1* | 10/2006 | Thione et al. ............ 726/9 |
| 2008/0098464 | A1* | 4/2008 | Mizrah ............ 726/5 |
| 2008/0307515 | A1* | 12/2008 | Drokov et al. ............ 726/7 |

* cited by examiner

AUTHENTICATION OF DATA COMMUNICATIONS

CROSS-REFERENCE TO RELATED APPLICATIONS

This application claims priority under 35 U.S.C. §119 from European Patent Application Nos. 08103622.0, 08103618.8, and 08103620.4, each filed on Apr. 18, 2008, the entire contents of each are incorporated herein by reference.

BACKGROUND OF THE INVENTION

1. Field of the Invention

This invention relates generally to authentication of data communications, and more particularly, to intrusion detection in authentication of data communications with servers over data communications networks.

2. Description of the Related Art

When a user wishes to communicate over a data communications network with a remote server, some form of authentication procedure is often required. FIG. 1 of the accompanying drawings illustrates an exemplary scenario which will be used to demonstrate various problems associated with authentication systems. This scenario is commonly encountered in open networks such as the Internet. A user at a computer A wishes to communicate via a set of network nodes I(1), I(2) ... I(n) with a remote server B, where "server" is used here in the most general sense and includes any computer or system providing some service or functionality to connecting users. The parties A and B wish to communicate confidentially with each other, i.e., in a way that ensures that information transferred between them is both inaccessible to third parties and has not been altered by third parties. All information, however, is flowing over the network nodes I(1) ... I(n) that are deemed essentially insecure. These nodes can possibly be compromised by attackers interested both in the content of the information exchanged between A and B as well as in changing this information in a way indiscernible to either party. This situation is commonly found in high-value secure commerce transactions over the Internet, e.g., when performing home-banking or online purchasing.

To ensure the desired properties of data confidentiality and integrity in the above scenario, the use of encryption and authentication protocols is common practice. Under the assumption that it is possible to exchange a secret key between A and B, all information sent over the network nodes can essentially be secure from snooping or reading, and interference or changing. Protocols such as TLS/SSL (Transport Layer Security/Secure Sockets Layer) and PKI (Public Key Infrastructure) are being deployed to facilitate this. However, setting up such common secret keys is not straightforward in view of two complications: (a) the user computer A cannot be guaranteed secure from malign interference, such as viruses or worms for example; and (b) while correctly establishing the identity of B at A, e.g., via an SSL server certificate, is technically possible, this is not straightforward for the user when the potential compromise of A is taken into consideration.

The most secure configuration possible addressing consideration (a) is illustrated on a conceptual level in FIG. 2 of the accompanying drawings. Here, three devices embraced by the dashed lines in the figure take the place of user computer A in the FIG. 1 system. Specifically, the core security data, such as a secret key for encrypting/decrypting communications, is contained in a secure device C which is supplied to the user by the provider of back-end system B. Device C typically includes a secure chip which is physically protected against tampering, e.g., using self-destructing data containers or at least intrusion detection sensors. A standard form indicator for device C is a smart card. In any case, as C has no user-interface device, a reader device R is required to interface between C and the user and the possibly modified user computer represented here by A'.

Currently the highest level of security is achieved by deploying a PKI-enabled smart card as component C in FIG. 2. Users have to insert this into a device R in the form of a certified/provably-secure smart card reader which is connected to the user computer. See Hiltgen et al., "Secure Internet Banking Authentication", IEEE Security & Privacy magazine, Vol. 4, No. 2, March 2006. In this setting, a complete, electronic, two-way authentication and establishment of secure keys between C and B can take place during establishment of a connection, practically without user intervention. It is advisable, though, that the user also provides an element of secret information, known only to him and C, so as to avoid operation of C in his absence, e.g., if C has been stolen. This secret information is normally a PIN that the user enters into reader R to "open" C for communication with B.

An alternative is the presentation of some biometric data, such as a fingerprint, to "open" C. This system provides for reliable authentication of the communications to be conducted between the user computer A' and server B by ensuring that C and B can each verify the identity of the other and are operating with the user's consent. A fundamental problem with this system, however, is that reader device R is typically very expensive as a result of the need for a "provably-secure platform". This presents a significant barrier to commercial deployment of the system.

Various alternatives for establishing trust between C and B exist which differ basically in the level of connectivity, connections cr and ra in FIG. 2, and reliance on the devices R and A'. For example, systems are known which integrate R into A' by providing a smart card reader in the user computer. Aside from the issue of reader cost, this requires hardware installation at A' which is non-trivial for technically inexperienced users. Moreover, such systems suffer from the basic unreliability of the user computer A' as illustrated in FIG. 3. A subverted, i.e., "hacked", user computer A' can easily capture all information on the link cr, including the exchange of the user PIN. With this information, and control over the next hop node, a subverted computer A' can enable a hacker H to assume the identity of the real user and perform transactions with B "on his behalf". In general, the only way to avoid such attacks is to provide a system for authenticating communications between the user computer A' and server B whereby each party can be sure of the identity of the other. To achieve this, communication endpoints C and B need to be able to verify that they are indeed talking to each other, ideally with some input from the user to confirm the user's consent.

As a trade-off between the above systems, it is known to use disconnected and very inexpensive readers R to interface with device C. The disconnection of the user computer and reader R inhibits a hacker from gaining access to security information, such as the user's PIN, on the link cr as in the FIG. 3 scenario. In such a low-cost setting, the communication link to B is established by the user transferring information across the link ra in FIG. 2 as part of a challenge/response authentication protocol.

In particular, some information X sent by B is displayed to the user at computer A', and the user has to type this into the reader R which communicates the information to C. C uses the security data stored in its secure memory to generate a response X' which is returned to R for display to the user, and the user types X' back into A'. The response X' is then sent back to B for verification. While this scheme remedies the cost issue, it creates several problems. First, the extent of the required user interaction is inconvenient, reducing general acceptability of the system. Second, no real end-to-end authenticity, as guaranteed by a PKI protocol, is established as the full PKI security channel cannot be set up this way. The amount of data for such end-to-end authentication is rather large, several hundred bytes, and it is not feasible for a user to transfer this amount of data back-and-forth between R and A' by typing. As a consequence, C cannot be sure that it is creating responses/data for an authentic B and can thus be primed to compute responses to challenges.

Considering the arrangement of FIG. 3, a hacker H can send challenges he received from B to C. While the cooperation of the user is required in this, it is known that users oblige if they believe they are communicating with the authentic B and, as already indicated, this is not straightforward to ascertain, particularly if one assumes that A' has been subverted. Under these circumstances and due to the low bandwidth of communications across ra, attackers can be successful with neither C nor B noticing subversive operations.

A modified version of the system just described uses a reader R with a sensor for sensing the fluctuations in a flickering image which is displayed at A' and encodes the authentication message from server B. The reader is held close to the screen to allow the sensor to detect the fluctuations, and the resulting message X is then communicated to C. The remainder of the authentication process is the same as before, whereby the user types back C's authentication response X' into user computer A' to bridge connection ra. While this represents an improvement to the previous system, fundamental problems still remain. Inconvenient user interaction is still required for the return path across ra, and the limitations inherent in the user involvement mean that full bidirectional end-to-end authentication is still inhibited, whereby the possibility of malign interference still remains.

Some aspects of the problems discussed above are addressed by intrusion detection (ID) technology. This technology involves observation of the behavior of networks and computers, e.g., communications and program execution patterns, with a view to detecting intrusions and in particular any malicious or unauthorized intervention which can compromise system security. Through use of such measures, ID systems try to protect all parties in a network from "misrepresentations" as to who-is-who.

However, current ID systems are of limited usefulness in the context of the authentication scenarios discussed above. An ID system typically sits just inside a network router and checks for intrusions in a specific network node I. In FIG. 2, for example, such an ID system cannot check the integrity of all components depicted; the components belong to different entities and are subject to different intrusion detection policies. While ID systems are increasingly federated, cooperating across areas of local concern, a limitation with existing ID systems is that they cannot observe all components involved in a secure transaction operation across a diverse network such as the Internet.

SUMMARY OF THE INVENTION

An aspect of the present invention is an apparatus for authenticating communication between a user computer and a server via a data communications network. The apparatus includes: (i) a security device having: (a) a memory containing security data; and (b) a security logic configured to use the security data to generate an authentication response to an authentication message received from the server in use; (ii) an interface device configured for data communication with the security device, the interface device having: (a) a receiver configured to receive from the user computer an authentication output containing the authentication message sent by the server to the user computer in use; and (b) an interface logic configured to extract the authentication message from the authentication output and to send the authentication message to the security device; and (iii) a communications interface configured to connect to the server via a communications channel bypassing the user computer, wherein one of the security device and interface device is configured to send the authentication response to the server via the communications channel.

Another aspect of the present invention is a method for authenticating communication between a user computer and a server via a data communications network. The method includes the steps of: (i) sending an authentication message via the data communications network to the user computer; (ii) producing an authentication output containing the authentication message; (iii) receiving the authentication output from the user computer; (iv) extracting the authentication message from the authentication output; (v) sending the authentication message to the security device; (vi) generating an authentication response to the authentication message using security data stored in the security device; and (vii) sending the authentication response to the server via a communications channel which bypasses the user computer.

Another aspect of the present invention is an intrusion detection method for a data communications system in which a security device having memory containing security data is adapted for data communications with a remote server via an interface device for communicating with the server via a first communications channel and is operative to communicate with the server via at least one further communications channel. The method includes the steps of: (i) sending an authentication message from the server to the security device using the first and the at lease one further channels in respective authentication communications; (ii) sending an authentication response generated from the security data by the security device to the server for mutual authentication thereof; (iii) detecting differences between authentication results from the communications using the first and the at lease one further channels; and (iv) identifying potentially compromised components of the data communications system based on the differences.

Another aspect of the present invention is a data communications system which includes: (i) a server; (ii) a first interface device operative to communicating data with the server via a first communications channel of the system; (iii) a security device having memory containing security data operative to communicate with the server via the first interface device and operative to communicate with the server via at least one further communications channel of the system; and (iv) intrusion detection logic. The server and security device are operative to use the first and the at lease one further channels in authentication communications in which the server sends an authentication message to the security device and the security device sends an authentication response generated using the security data to the server for mutual authentication thereof. The intrusion detection logic is operative to detect differences between authentication results from the communications using the first and the at least one further channels and to identify potentially compromised components of the data communications system based on the differences.

Another aspect of the present invention is an authentication apparatus for authenticating data communications with a remote server. The apparatus includes: (i) a security device having memory containing security data, and a security logic adapted to use the security data in authentication communications with the server to generate an authentication response to an authentication message received from the server; (ii) a first interface device adapted for data communications with the security device and adapted for data communications with the server via a first communications channel; (iii) at least one communications interface for communicating with the server via a second communications channel; and (iv) channel selection logic adapted to select one of the communications channels for authentication communications with the server in dependence on a security indicator associated with a communication from the server on the first communications channel, the channel selection logic being adapted to send the authentication response, generated by the security logic in the authentication communications, to the server via the selected communications channel.

Another aspect of the present invention is a method for authenticating data communications with a remote server performed by a security device which has memory containing security data, the security device adapted for data communications with an interface device for communicating with the server via a first communications channel, and which is operative to communicate with the server via a second communications channel. The method includes the steps of: (i) selecting one of the first and second communications channels for authentication communications with the server in dependence on a security indicator associated with a communication from the server on the first communications channel; (ii) in response to an authentication message received from the server, using the security data to generate an authentication response; and (iii) sending the authentication response to the server via the selected communications channel.

DETAILED DESCRIPTION OF THE PREFERRED EMBODIMENTS

Before describing embodiments of the invention, authentication systems incorporating various features which can be utilized to advantage in embodiments of the invention will be described with reference to FIGS. 4 to 10.

Figure 1:
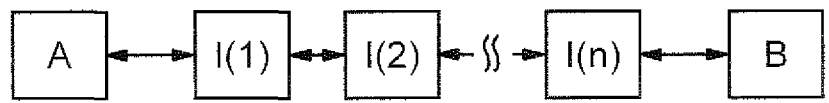
FIG. 1 represents a user computer and server communicating via a data communications network.
Figure 2:
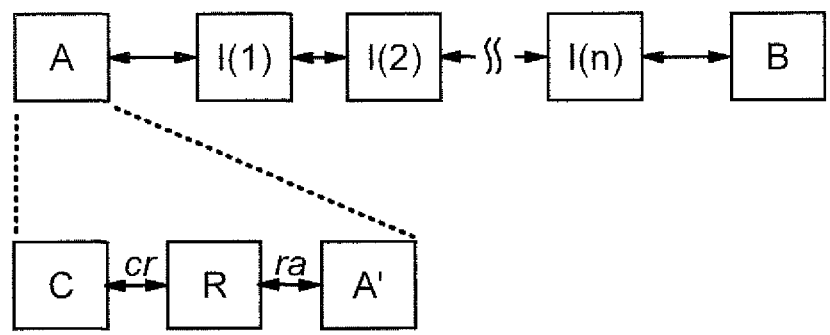
FIG. 2 illustrates apparatus for authenticating communications in the FIG. 1 system.
Figure 3:
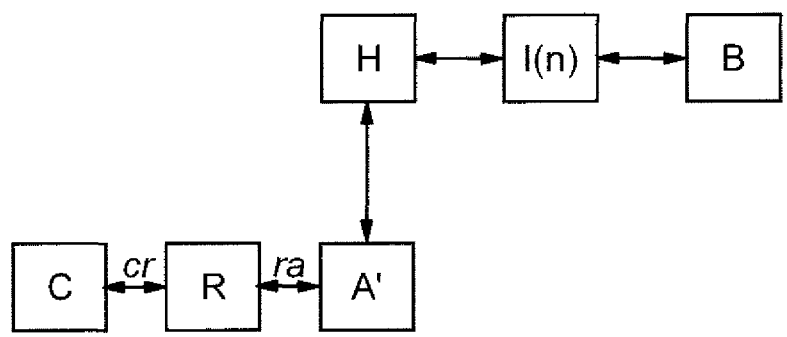
FIG. 3 illustrates intervention of a hacker in the FIG. 2 system.
Figure 4:
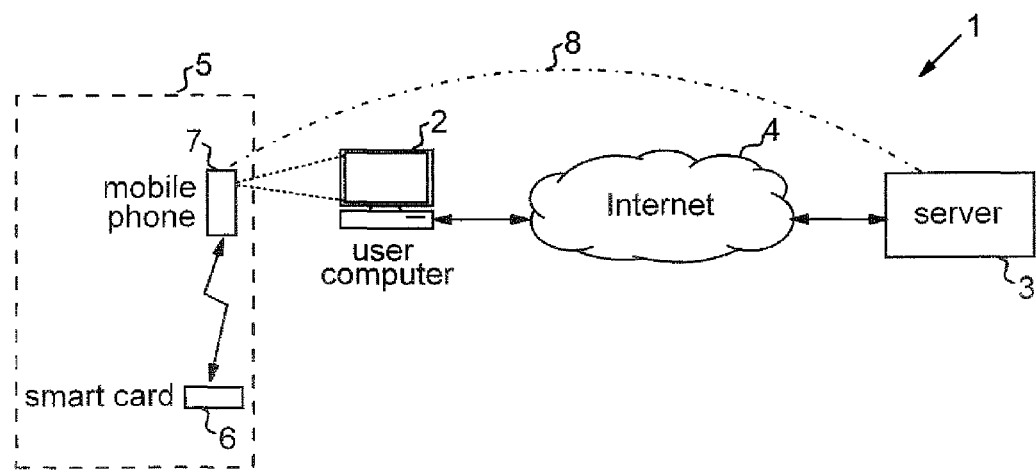
FIG. 4 illustrates a communications system incorporating authentication apparatus.

FIG. 4 shows a schematic representation of a communications system 1. The system 1 includes a user computer 2 via which a user can communicate with a remote server 3 via the Internet 4. For the purposes of this example, it is assumed that server 3 gives access to an on-line banking service to which the user at computer 2 periodically connects to perform banking transactions. To authenticate communications between computer 2 and server 3, the system 1 includes authentication apparatus indicated generally at 5. Authentication apparatus 5 includes a security device, here a contactless smart card 6, and an interface device, embodied here by a mobile phone 7. Mobile phone 7 serves to interface between the smart card 6 and user computer 2 in the authentication process to be described, and can also connect to server 3 via telecommunications channel 8.

Figure 5:
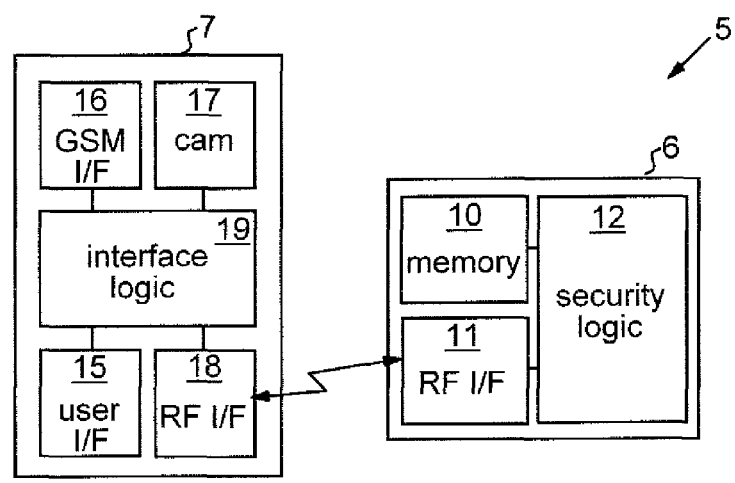
FIG. 5 is a more detailed schematic of the authentication apparatus of FIG. 4.

FIG. 5 is a schematic block diagram of the authentication apparatus 5 showing the main elements involved in the authentication process. Smart card 6 is supplied to the user by the bank and has secure memory 10 containing security data. Here, a secret key S is to be used in the authentication process together with a user personal Identification number (PIN) which is known to the user. The card 6 includes a radio frequency (RF) interface 11 for wireless communication with mobile phone 7, together with security logic 12 for performing the authentication operations detailed below. Mobile phone 7 includes the usual user interface 15 including a keypad and display, and Global System for Mobile communications (GSM) interface 16 for calls over the GSM telecommunications network. The phone 7 also has a built-in camera 17 and an RF interface 18 for communications with smart card 6. Interface logic 19 controls operation of the various components and implements steps of the authentication process described below. In general, the control logic, including security logic 12 and interface logic 19, of this apparatus can be implemented in hardware, software or a combination of the two. In this example, however, the logic is implemented by software running on respective processors of phone 7 and card 6, and suitable software will be apparent to those skilled in the art from the description provided here.

Figure 6:
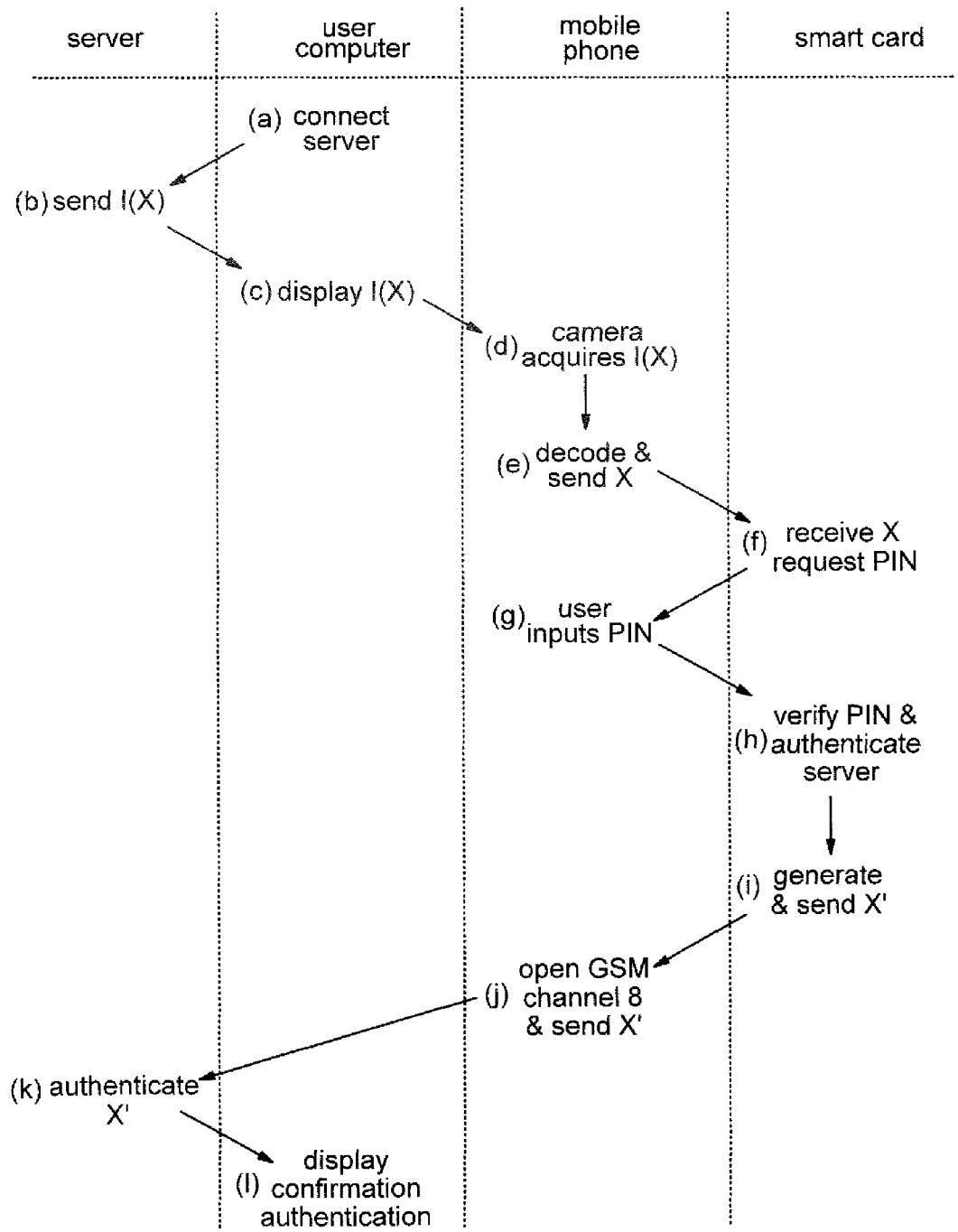
FIG. 6 indicates steps of the authentication process performed in the FIG. 4 system.

An overview of operation of the authentication system 1 will be described with reference to the process flow of FIG. 6. This indicates basic steps of the authentication process performed at each of the component devices of system 1. The process begins with step (a) where the user connects over the Internet to server 3 from computer 2 in order to perform a secure transaction. The server 3 establishes a link-encrypted protocol, such as SSL, to computer 2 and then transmits an authentication message X as indicated by step (b) of FIG. 6. The message X is encrypted under the secret key S provided in smart card memory 10 and is encoded in an image I(X) which is displayed on the screen of user computer 2 in step (c).

The authentication message can be encoded in image I(X) in any desired fashion, for instance as a 2-D barcode. The encrypted data also contains error correction bytes to be operated upon within smart card 6. The displayed image can instruct the user to photograph I(X) with camera 17 of mobile phone 7, and by doing so the image I(X) is acquired, step (d), and supplied to interface logic 19. In step (e), the interface logic decodes I(X) to extract the encrypted authentication message X and transmits this data set in a binary form to smart card 6 via RF interface 18.

In step (f), security logic 12 of smart card 6 receives the authentication message via RF interface 11 and requests the user PIN via the RF channel to interface logic 19. The interface logic requests input of the PIN via user interface 15, step (g), and transmits the resulting input back to security logic 12. In step (h), the security logic verifies the PIN against that stored in memory 10 and, provided the PIN is valid, proceeds with the reverse error correction algorithm and decryption operations using the key S from memory 10. The security logic can identify whether the message X has been decoded correctly, for example by determining that the message has an expected form or content. In this way, the logic 12 determines that it is in contact with the authentic server 3.

Assuming the message X from server 3 has been authenticated by the above process, the security logic proceeds in step (i) to generate an authentication response X'. This can be done in a variety of ways, e.g., by encrypting an agreed part of the message X, or some pre-agreed security data such as a one-time password stored in memory 10 and/or a response to a challenge transmitted within message X, under the secret key S. The resulting encrypted authentication message X' is then transmitted via the RF channel to interface logic 19. In response to receipt of X' in step (j), the interface logic automatically activates GSM interface 16 to place a call to server 3. On connection, the interface logic sends the authentication response X' over the resulting GSM channel 8 to server 3 using the GPRS (General Packet Radio Service) packet protocol. The server 3 receives the authentication response in step (k) and, knowing key S and the expected response m, can compute S[m] and determine whether the challenge has been met or not, i.e., whether the genuine smart card 6, and by implication the authorized user, are responding. Assuming the response is valid, the server 3 can permit the communications with computer 2 to proceed, and a message indicating successful authentication of the communications can be displayed at computer 2 in step (l). The user can then proceed to interact with the server via computer 2 to perform the desired transaction.

Note that the authentication procedure can be applied again as part of the actual transaction, e.g., the transfer of some amount of money to a recipient's account M. In this case, for example, the authentication message can be augmented with details of M, and the security logic 19 can decode some possibly-unencrypted part of the message to display the nature of the transaction on user interface 15. The security logic 12 of card 6 can then check the recipient account number against a pre-agreed list in memory 10 as part of the authentication process. In any case, if the authentication process fails at any stage, communications between the user computer and server will be denied, and various consequential actions can be taken as deemed appropriate. For example, the smart card 6 can be internally shut down by security logic 12 or invalidated for future operations at server 3, with the authorized user being notified accordingly.

Due to the hardware and cost limitations in smart card systems, the smart card usually cannot maintain a time source of its own and thus has no way to detect attacks such as challenges which are "surprisingly-often" fielded. In the above process, however, the authentication message X sent by server 3 preferably also contains the current time. On receiving message X, the security logic 12 in smart card 6 thus learns the time at which the server sent the message. This time can be stored in memory 10, and allows the security logic to detect replay attacks and overly-frequent authentication attempts.

If an authentication message is received which decrypts correctly, but which contains a known time or a time before one already received, the security logic can be configured to shut down, not responding to any further authentication attempts. In addition, the security logic 12 can assess the probability of an improper authentication by checking the time that has elapsed since the preceding authentication attempt. This time difference can be used to calculate a "trust rating" t, for example ranging from 0 to 9. The calculation of the original response X'=S[m] can then be modified such that X' is S[m|t], representing a reversible addition of t to m, such as by concatenation to m or XORing a pattern of t over m.

When the resulting authentication response is received by server 3, the server can perform several calculations of S[m|t] for all possible values of t and so determine the trust rating assigned by smart card 6. The server can then use this information in deciding whether to proceed with the communication, be it an initial authentication attempt or authentication for a transaction. The server 3 can, for instance, flag the communication as suspicious for closer examination or simply to reject it outright. Various other information can be included in authentication messages X for use in such trust level calculations. For instance, the IP address of the user computer that the server claims to be in contact with, and/or details of a transaction type, amount, recipient, etc., can be included in message X. The security logic 12 can be configured to assess such information by comparing with information pre-stored in memory 10 and/or applying an algorithm accounting for multiple indicators, including authentication frequency, time of day, etc., to generate a resultant trust level t for communication to the server in the authentication response.

Various additional security features can also be provided. For instance, a user interface for input of some form of biometric user data, such as a fingerprint scan, can be provided in the authentication apparatus, to supplement or replace the user PIN. In this case, the match rate for the biometric user input can be included in the calculation of the trust rating described above. In general, the actual security information exchanged between the server and security device can include one-time passwords or any mutually known secrets, e.g., for challenge-response protocols.

Protocol software in the interface device can also have the ability to set IP address fields for the server and/or user computer, e.g., white/black lists of acceptable/unacceptable IP addresses or IP subnet or net masks. In a high-security mode that can be set during issuance at the choice of the user, the security device can be configured to not allow this, whereby only known IP addresses encoded in the security information will be accepted. The process for setting acceptable IP addresses can be made non-trivial, such that naive users cannot be tricked into setting the IP address of a hacker, but not too complicated to prevent traveling users using computers in many different networks from adapting. Interface device software can also have the ability to set recipient account numbers in the security device, again either as black or white lists.

In a high-security mode, accepted recipient account numbers will be pre-loaded in the security device such that no way exists to change them. In this case, the security device can only be used to authorize transactions to initially known recipients. The interface logic can also be adapted to interpret part of an authentication message, e.g., as part of a logon or funds transfer operation, to display information on the nature of the transaction and give the user further feedback.

The above provides a simple system for reliable bidirectional authentication of communications between the user computer 2 and server 3. The system can be implemented at low cost, exploiting the inherent functionality and wide availability of mobile phones to provide a convenient and user-friendly authentication mechanism.

In a modification of the above system, the security logic 12 of smart card 6 incorporates channel selection logic. This channel selection logic is responsive to a security indicator associated with the authentication message X received from the server. In response to this security indicator, the channel selection logic selects one of the two available communication channels for sending the authentication response to the server. That is, the channel selection logic decides whether to use the GSM channel 8, as in the above system, or simply to use the return channel via user computer 2. In the latter case, the authentication response can be encoded in a message which is displayed by phone 7 and typed in to computer 2 by the user. The channel selection logic thus instructs interface logic 19 of phone 7 which channel to use in a given case, and the interface logic is adapted to respond accordingly.

This simple system allows the smart card 6 to decide when it is necessary to use GSM channel 8 in authentication communications for security reasons. For example, this channel can be used only if the security indicator indicates that a high level of security is required. The security indicator here can depend on various information and can be associated with the message X, and determined by the channel selection logic, in a variety of ways. This will be discussed further below in connection with the preferred system of FIG. 7 which is based on the same basic principle just described.

Figure 7:
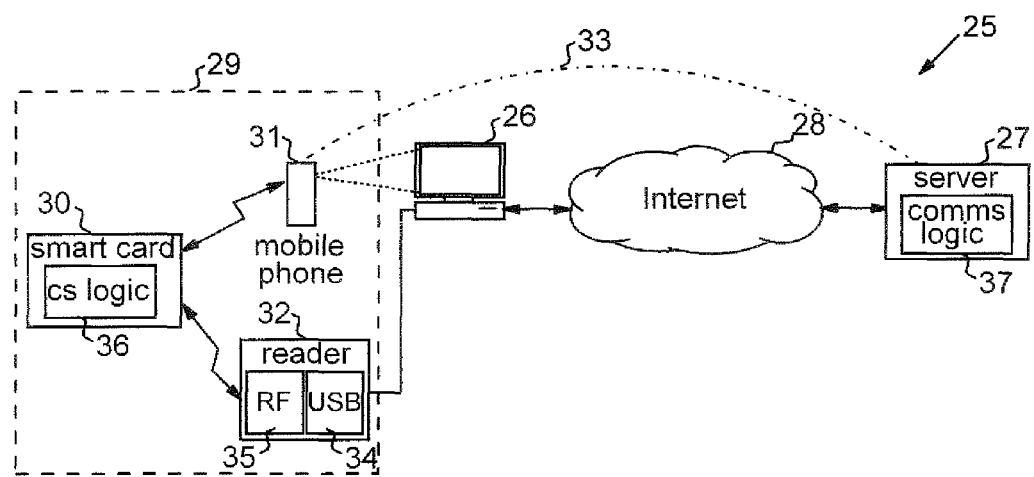
FIG. 7 illustrates another authentication system.

The authentication system 25 of FIG. 7 includes a user computer 26 which communicates with remote server 27 via the Internet 28 as before. The authentication apparatus, indicated generally at 29, of this system includes a security device, again a contactless smart card 30, a first interface device, embodied here by a mobile phone 31, and a further interface device in the form of card reader 32. As before, mobile phone 31 is adapted for communication with server 27 via two communications channels, a first channel via computer 26 and a second, GSM channel 33. The card reader 32 is connected by cable to computer 26 and includes an interface, here a USB interface 34, for communicating with the computer 26, thus providing a further communications channel to server 27. Card reader 32 can also communicate via an RF interface (I/F) 35 with smart card 30 which in turn communicates with mobile phone 31 as before.

Figure 8:
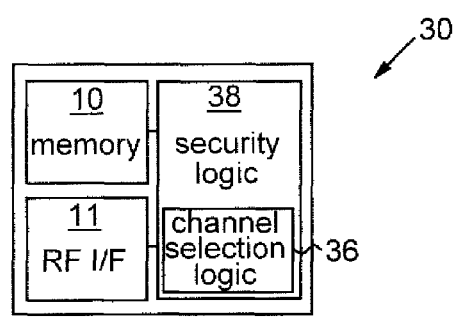
FIG. 8 is a schematic diagram of a security device in the FIG. 7 system.
Figure 9:
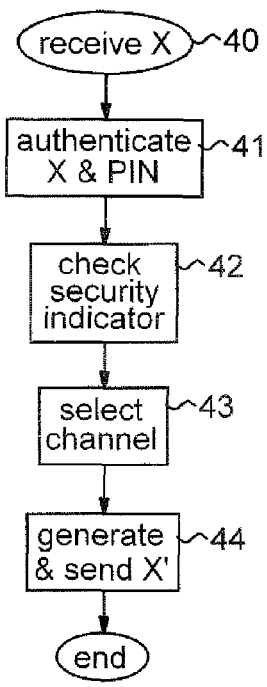
FIG. 9 indicates steps performed in operation of the security device of FIG. 8.
Figure 10:
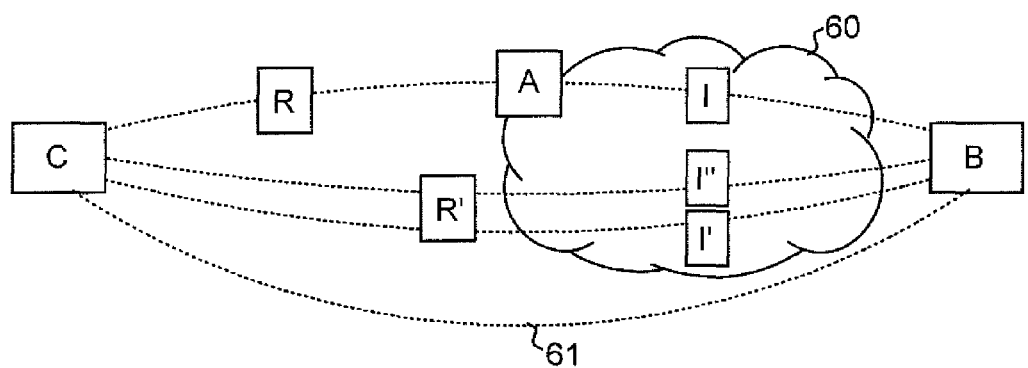
FIG. 10 is a generalized schematic illustrating further authentication systems; embodying the invention.

To implement the authentication channel switching process to be described, channel selection (cs) logic 36 is provided in smart card 30. Communications logic 37 is similarly provided in server 27 for use in this process. The channel selection logic 36 is provided as part of the security logic 38 in card 30 as indicated in the schematic of FIG. 8. The structure and operation of smart card 30 thus corresponds generally to that of card 6 in FIG. 5, and only the key differences will be described in the following.

Operation of the FIG. 7 system will be described here in the context of the scenario considered in FIG. 6. In the present case, the authentication operation proceeds as before up to step (h) of FIG. 6 whereupon the channel selection logic 36 comes into operation. The operation of smart card 30 corresponding to steps (f), (h) and (i) in the relevant column of FIG. 6 is represented by the simple flow diagram of FIG. 9. The operation begins at step 40 when the security logic 38 receives the authentication message X sent by server 27 on the first communications channel via computer 26 and mobile phone 31. In step 41 the security logic obtains and verifies the user PIN and authenticates the server by processing the message X as in steps (f) and (h) of FIG. 6. Assuming the user PIN and message X are deemed authentic, operation proceeds to step 42.

Here, the channel selection logic checks a security indicator associated with the message X. In this example, the security indicator has a number of contributory components dependent on data contained in the authentication message X sent by server 27. In the present scenario, the relevant data in message X is considered as being the current time stamp inserted by server 27 and the IP address that the server claims to be in contact with. The channel selection logic 36 checks the IP address against a list of approved addresses in memory 10, and checks the time stamp against that stored in memory 10 for the last authentication attempt. If the IP address is not on the approved list, or the time stamp is deemed suspect, e.g., the same or earlier than the last time stamp or too close to the last time stamp as previously discussed, then the security indicator is deemed to indicate a high security state, otherwise a low security state is indicated. In step 43, the communications channel to be used for the authentication response is then selected by logic 36 in dependence on the security indicator.

A high security state can result from compromise of user computer 26. Thus, when a high security state is indicated, logic 36 selects GSM channel 33, which bypasses computer 26, for the return authentication communication. When a low security state is indicated, the default return channel via reader 32 is selected in step 43. Next, in step 44, the security logic generates the authentication response X' as discussed above, and channel selection logic 36 sends the response to the appropriate device 31, 32 for return via the selected channel.

On receipt of a valid authentication response, server 27 can authenticate the smart card 30, and a message can be displayed at computer 26 whereupon the user can proceed with a transaction via the computer 26 as before. However, the channel selection facility described above allows the communications logic 37 of server 27 to perform additional security checks. For example, if an authentication response is received when no authentication message has been issued by the server, e.g., pursuant to a replay attack on computer 26, then the communications logic can immediately determine that security has been compromised. Also, the communications logic can be configured to predict the return channel which should be selected by card 30 in a given case, an incorrect selection immediately marking a communication as suspicious.

The simple system described above illustrates how the facility to select between the available communications channels for authentication communications provides a simple, convenient and highly effective mechanism for improved security in the authentication process. Moreover, the simple mechanism described above can be extended in various ways. In particular, the security indicator can be dependent on various additional data. For instance, the authentication process can be repeated as part of an actual transaction as described above, in which case the security indicator can be dependent on details such as transaction type, amount, recipient, etc., included in a communication, e.g., an authentication message, sent by server 27. The security indicator can also depend, for example, on the result of a biometric user input and/or a trust rating calculated by the smart card logic as described earlier. In general, the channel selection logic 36, and preferably also the communications logic 37 of server 27, can be configured to decide on the appropriate channel for authentication communications using rule sets or other algorithms for expressing security indicators based on a variety of different parameters.

While the security indicators described above are dependent on data included in a communication from the server, in general a security indicator can be associated with such a communication in other ways. As an example, if a security device maintained its own time source, a security indicator can be envisaged based on locally-determined timings for received communications. In the simple system above the security indicator reflects a high or low security condition for selection between two channels by logic 36. It will, of course, be appreciated that similar principles can be used where more than two communications channels are available for selection, different ones of the available channels being used according to the security condition indicated by different security indicator states. Various system configurations are indicated schematically in the generalized diagram of FIG. 10. This shows various possible communications channels for use in authentication communications between a security device C and remote server B.

In general, based on automated and configurable rules for assessing security indicators, logic in security device C, and preferably also server B, can decide on a selection between channels using different interface devices R, R', user computers A, intermediate nodes I, I', I" of network 60, or even different networking protocols, such as GSM, completely bypassing network 60. In particular, SIM toolkit functionality can be employed in security device C allowing establishment of a direct, encrypted channel 61 between C and B bypassing all devices R, R', A, I, I', I" which may be compromised. In general, a variety of combinations of different logical and physical channels can be envisaged, utilizing, for example, GSM, WiFi, WiMax, GPRS or any other long-distance or Internet-connecting technology. The channel selection process can be triggered not only for preliminary authentication communications at the start of a session, but also by a communication during a session after an initial authentication process. For instance, if a transaction is initiated to a hitherto unused bank account, another authentication communication can be instigated by the server, for example causing the security device to select a new channel bypassing the user computer for the authentication procedure. Such an established encrypted channel can also be employed for transporting new security data such as a new set of one-time passwords.

Figure 11:
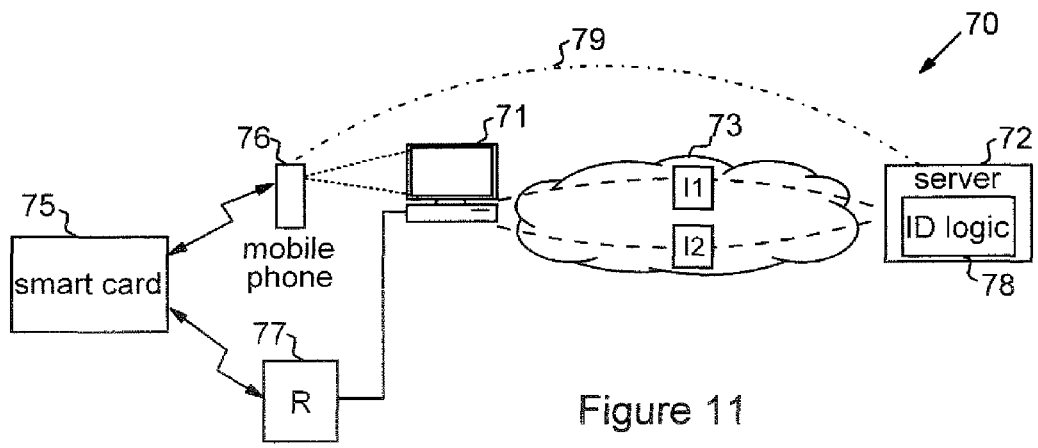
FIG. 11 illustrates another data communications system.

FIG. 11 illustrates a communications system 70 similar to system 25 of FIG. 7 but adapted to implement an intrusion detection method embodying the present invention. In system 70, a user computer 71 communicates with remote server 72 via the Internet 73 as before. The system also includes a security device and first and further interface devices embodied by smart card 75, mobile phone 76, and card reader (R) 77 as before. The structure and operation of the various components of system 70 correspond generally to those of their equivalent components in FIG. 7, and only key differences will be described in the following.

In this embodiment, server 72 includes intrusion detection logic 78 for implementing key steps of the intrusion detection process to be described. In addition, communications between smart card 75 and server 72 can utilize two routes across network 73 under control of server 72 and/or protocol software provided in computer 71 or interface devices 76, 77. In this simple example, these routes are represented in the FIG. as passing through nodes I1 and I2 respectively. In this system, therefore, card 75 can communicate with server 72 via mobile phone 76 over three communications channels: a first channel via computer 71 and node I1; a second channel via computer 71 and node I2; and a third, GSM channel 79 as before. Two further communications channels are also provided via card reader 77 and computer 71, via network nodes I1 and I2 respectively.

Figure 12:
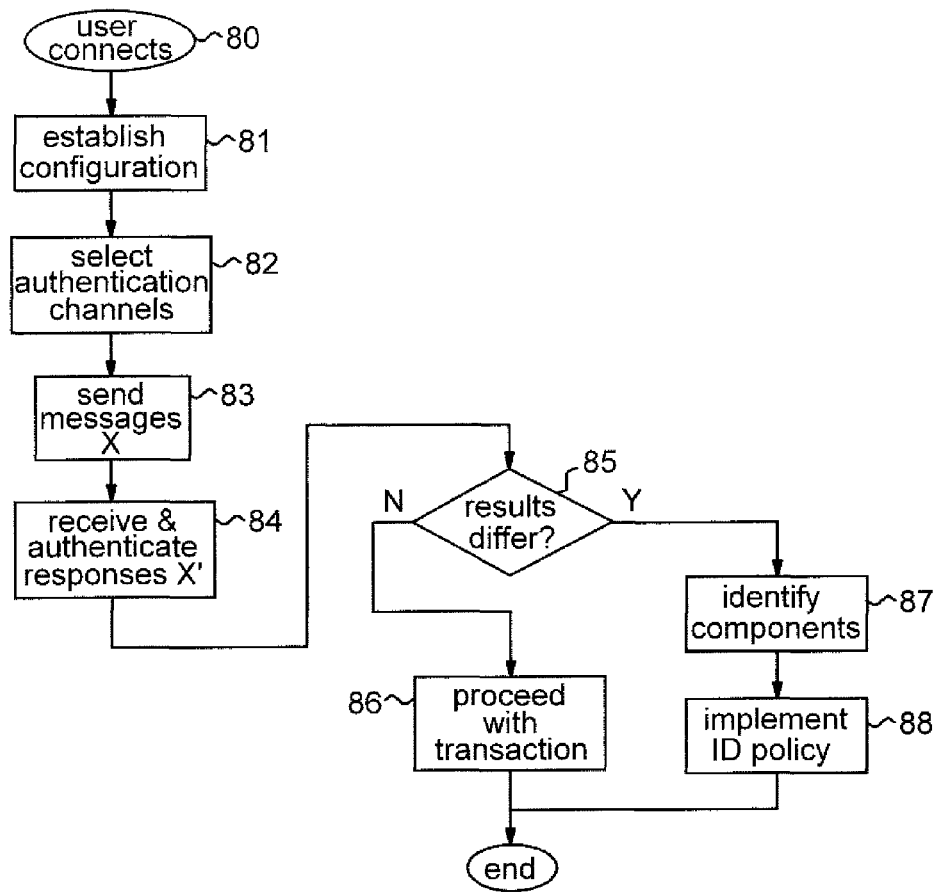
FIG. 12 indicates steps performed by a server of FIG. 11 in performance of an intrusion detection method.

Operation of the system in authentication communications will be described with reference to the simple flow diagram of FIG. 12 which illustrates the main steps performed by server 72 in this process. The operation commences at step 80 when the user at computer 71 connects to server 72 to perform a secure transaction. Unless predefined for the user, information defining the local configuration of the authentication apparatus 75 to 77 is then communicated to server 72, for example by client software on computer 71 and/or interface devices 76, 77. In this way, the server 72 establishes the available communications channels for the authentication procedure, as represented by step 81 in FIG. 12.

In this embodiment, in step 82 the server selects a subset, for example two, of the available communications channels for parallel authentication communications with card 75. The particular subset and number of channels can be selected here in various ways in accordance with predefined rules at the server. As a simple example, the server can simply select a different pair combination for each authentication process for a given user, so as to gradually cycle through all available combinations. Various more sophisticated selection processes, dependent for instance on the type of channels available and/or results of previous authentication procedures, can be envisaged and employed here as desired.

In the present example, server 72 selects both the outbound and return channels for each authentication communication, and in step 83 sends an authentication message X to card 75 on each outbound channel. Note that in general the channel selections for the two authentication communications can differ in only one of the outbound and return channels, so that in some cases only a single message X can be sent to which authentication responses are expected on different return channels. In any case, the authentication message X in this example indicates the return channel to be used by card 75. In this system, therefore, channel selection logic in card 75 is responsive to the instruction in an authentication message to select the appropriate return channel.

Assuming the authentication procedure at card 75 is successful for each received authentication message, the card will generate an authentication response X' as described above. The authentication responses X' for the two authentication communications will be returned via the appropriate channels and received by server 72 in step 84 of FIG. 12. The server can then authenticate the card 75 using both responses X' as described earlier. If the authentication procedure at card 75 fails for either communication, then this can be notified to server 72 by a message on the appropriate return channel. In any case, the authentication results for the parallel authentication communications are monitored by intrusion detection logic 78 of server 72. If the authentication process, at the card or server, fails for one communication while that for another succeeds, then this difference will be detected by logic 78 in decision block 85 of FIG. 12. Assuming all authentication procedures are successful, however, then no such difference will be detected in this example, and in step 86 the server 72 will then allow the user transaction to proceed as before. On the other hand, if different authentication results are detected at step 85, then operation proceeds to step 87. Here, logic 78 analyzes the system configuration information in server 72 to identify those system components in the channel(s) used for the failed authentication communication but not in the channel(s) used for the successful communication. Since authentication failure can result from unauthorized intrusion, these components are considered as potentially compromised.

Having identified suspect components, logic 78 can instigate appropriate action, for example in accordance with an ID policy as indicated in step 88. The appropriate further action can depend on a variety of factors such as the particular nature and number of the components in question. Possible actions can include conducting further authentication communications to refine the component identification, disabling particular components or shutting down particular communications channels, conducting or instigating further, independent security checks for particular components, and recording certain components as suspect in a log for use in subsequent security assessments. The policy can allow further communications on a successful authentication channel, or can simply reject the authentication attempt and close down all channels.

Assuming the user is permitted to proceed with a transaction, the parallel authentication procedure described above can be repeated during the session, for example at intervals or in response to particular triggers such as requesting use of a previously unused account number as discussed earlier. Different subsets of the available communications channels can be employed for each such procedure, allowing integrity of all channels to be tested over time. The intrusion detection logic 78 can also compare authentication results from communications performed at different times to obtain further channel comparison information for use in identifying potentially compromised components.

Various alternatives can be envisaged to the simple embodiment described above. For example, the channel selection for the authentication communications can be performed in general by the card and/or server. Rather than the server selecting all channels as above, channel selection logic in the card can select the return channels in a similar manner to card 30 in FIG. 7. Alternatively, the card and server can communicate or use predefined rules to decide on the channel selection for a given procedure. The number of channels selected for the authentication process can also vary for different procedures, depending on security factors for instance.

Embodiments can be envisaged in which differences, other than simply success or failure, are detected in the authentication results. For example, where card 75 determines some form of security rating, such as a security indicator or trust rating described earlier, this can be communicated to the server in the authentication response and differences in rating values detected by logic 78 for use in identifying suspect components. Components in a channel with a consistently poor security rating compared to other channels can be considered suspect for instance. In general, the particular components identified as suspect based on differences in authentication results can depend on the nature of the differences in question. These can simply be components exclusive to one channel, e.g., on which authentication failed, or the detected differences can point to more specific causes and hence components.

In other embodiments, the intrusion detection logic can be distributed between the card 75 and server 72. For example, the card security logic can be adapted to detect differences in local authentication results, such as differences in security ratings as mentioned above or results of checks which contribute to such ratings, and to notify the server accordingly. In general, however, the intrusion detection logic can be localised in a single physical device, whether the security device, the server or some other security management device to which authentication results are reported in use, or this logic can be distributed over a plurality of physical devices and these can perform different steps of the intrusion detection process. In particular, the step of detecting differences between authentication results can be performed, in general, by any device which has access to authentication results, though this is conveniently done locally at one, or possibly both, of the server and security device as described. Similarly, the step of identifying potentially compromised components can in principle be performed at any device(s) having access to the difference information, e.g., a security management device to which differences indicating suspect components are reported. In the example above where this step is performed at the server, the functionality of this server can of course be implemented in a single physical machine or distributed over different machines of a server system.

It will be understood that the foregoing provides for improved security in authentication communications as well as a convenient mechanism for detecting intrusions occurring anywhere in the communications system. While the simple system described uses channels differing in network nodes I1 and I2, in general multiple channels using various combinations of different nodes can be employed, the principles described allowing integrity of all such nodes to be assessed along with devices in the user authentication apparatus. Numerous system configurations can be envisaged, including the various configurations indicated in the generalized diagram of FIG. 10. A variety of different logical and physical communications channels can be employed in such systems, and in general the described mechanisms can be used to detect intrusions in any logical or physical level of hardware or software of any participating components I, R, etc. The described mechanisms effectively provide a session-level engine for checking any and all subsystems used during the authentication communications for potentially suspect behavior. In contrast to existing ID systems which cannot observe all components involved in a secure transaction operation across a diverse network such as the Internet, the mechanisms described offer the possibility of evaluating the integrity of all computing and networking systems involved during the network-traversing operations, decreasing the likelihood that intrusions anywhere in the network to go undetected. Information on potentially suspect components can also be shared between different instances of server 72, e.g., across banks' back-end servers using the same type of mechanism. By doing so, the server system effectively forms a self-defense network shielding from intrusions at application-/session-level by any, most probably shared node I and/or interface device R participating in transactions with one or several servers.

It will be of course be appreciated that, while preferred embodiments have been described above, various alternatives and modifications can be envisaged. Some examples are described in the following.

Rather than a smart card or other independent device, the security device in some embodiments can be implemented by a chip embedded in an interface device e.g., a SIM (Subscriber Identity Module), SAM (Security Access Module), or NFC (Near Field Communications security module) chip. An interface device used in the authentication apparatus can be, for example, a PDA or other device incorporating mobile phone communications functionality, or a smart card reader for a contact or contact-less smart card. The security and interface devices can in general communicate via hard-wired or wireless links, and interface devices can utilize various forms of receiver for receiving different types of authentication output from a user computer. For example, an authentication message can be encoded in a sound sequence or RF signal transmitted by the user computer and received by a microphone or RF receiver of an interface device, the interface logic being appropriately adapted to decode the authentication message from the output format in each case. Other wireless communication mechanisms, employing e.g., infrared, Bluetooth or NFC technology, can also be envisaged for communication between devices of the authentication apparatus. As a further example, an authentication response can be encoded in a sound sequence which generated by the security device, a phone being placed so as to receive and forward the sound sequence over a telecommunications channel to the server.

If the security device has been internally shut down as a result of detected/assumed attacks, e.g., replay of encrypted data, it may or may not be possible to revert it to an operational state again via some exceptional procedure. This can entail returning the device to the supplier for re-programming, or the sending of a specific unlocking code via an independent communications channel. The procedure can require the user to enter a very long data sequence, possibly a complete encrypted message, e.g., 16 hexadecimal characters for a 112 bit DES-encrypted data block, on an interface device keypad.

A first aspect of the present invention provides apparatus for authenticating communications between a user computer and a server via a data communications network. The apparatus includes: (i) a security device having memory containing security data, and security logic adapted to use the security data to generate an authentication response to an authentication message received from the server in use; (ii) an interface device adapted for data communications with the security device, the interface device having a receiver for receiving from the user computer an authentication output containing the authentication message sent by the server to the user computer in use, and interface logic adapted to extract the authentication message from the authentication output and to send the authentication message to the security device; and (iii) a communications interface for connecting to the server via a communications channel bypassing the user computer, wherein one of the security device and interface device is adapted for sending the authentication response to the server via the communications channel.

With apparatus embodying this invention, therefore, the authentication message from the server is extracted from an authentication output received from the user computer by the interface device and communicated to the security device. However, the authentication response generated by the security device is returned to the server via a separate communications channel which bypasses the user computer. The prior systems discussed above are all centered on use of a single physical channel for authenticating communications between the user computer and server. The present invention departs from this thinking, recognizing that involving the user computer in the authentication communications in both directions underlies various weaknesses in prior systems. Through use of a separate communications channel, bypassing the user computer, in embodiments of this invention problems inherent in prior systems can be obviated. Through operation of the receiver and logic of the interface device, the authentication output produced at the user computer can be received and the authentication message extracted, providing a convenient and efficient mechanism for conveying the authentication message to the security device without inherent bandwidth limitations. The separate channel bypassing the user computer is then used for the authentication response, whereby potential problems associated with subversion of the user computer can be avoided, and reliable bidirectional authentication can be achieved, without the cost penalties associated with prior provably-secure reader devices. A simple, elegant and highly effective mechanism is therefore provided for authenticating the communications to be conducted via the user computer.

While alternatives can be envisaged as discussed below, the communications interface for the separate communications channel to the server is preferably provided in one of the security and interface devices, the logic of that device being adapted to send the authentication response to the server via the communications interface. However, this communications interface is most conveniently provided in the interface device. The interface logic is then adapted to send the authentication response to the server via the communications channel on receipt of the authentication response from the security device. Depending on the particular implementation of the interface device, the interface logic may activate the communications interface automatically for this purpose or the user could be involved in this process, for example prompted by the interface device.

The interface device receiver may take various forms in preferred embodiments exploiting the security advantages of physical disconnection from the user computer and communication of the authentication message in such a manner that the message cannot easily be "read" by a subverted user computer. For example, the receiver could comprise an image sensor, advantageously a camera, for receiving an image encoding the authentication message displayed by the user computer. Other advantageous implementations include a microphone or RF receiver for receiving an auditory or RF output generated by the user computer. The interface logic is appropriately adapted to decode the authentication message from the output format in each case.

In particularly preferred embodiments, the interface device comprises a mobile phone whereby the inherent functionality, flexibility and wide availability of mobile phones can be exploited for a highly convenient implementation of the authentication system. In particular, the built-in microphone or, more preferably, camera in a mobile phone can be used as the receiver for capturing an authentication message encoded in an audio output or displayed image at the user computer. In addition, the inherent telecommunications interface can be exploited for bypassing the user computer and sending the authentication response to the server via the GSM or other telecommunications network. Moreover, the existing user-interface can be utilised for input of user identification data, as required in preferred embodiments, such as a PIN which can be verified by the security device to confirm user-consent. An interface device comprising a mobile phone could be a mobile phone per se or, for example, a PDA or similar device which incorporates mobile phone communications functionality.

In general, the security device could be integrated in the interface device or provided separately of the interface device. For example, the security device may comprise a chip embedded in the interface device. Alternatively, for example, the security device could comprise a smart card, with or without contacts, for insertion in, or wireless communication with, a suitably adapted interface device such as a dedicated card-reader or mobile phone device. In addition, while the separate channel for sending the authentication response to the server is conveniently a telecommunications channel opened via a mobile phone interface, in general any mechanisms which allow a connection to be made with the server, directly or indirectly via a single channel or a composite channel involving one or more intermediate devices, can be employed for this purpose, the key point being that the resulting communications channel bypasses the user computer.

A second aspect of the invention provides an authentication system that includes: (i) a server for communicating with a user computer via a data communications network, the server being adapted to send an authentication message to the user computer so as to produce, at the user computer, an authentication output containing the authentication message; and (ii) apparatus according to the first aspect of the invention for authenticating communications between the server and the user computer.

A third aspect of the invention provides a method for authenticating communications between a user computer and a server via a data communications network. The method includes the steps of: (i) at the server, sending an authentication message via the network to the user computer so as to produce, at the user computer, an authentication output containing the authentication message; (ii) at an interface device which interfaces between the user computer and a security device, receiving the authentication output from the user computer, extracting the authentication message from the authentication output, and sending the authentication message to the security device; (iii) at the security device, in response to receipt of the authentication message, using security data contained in memory of the security device to generate an authentication response to the authentication message; and (iv) at one of the security device and interface device, sending the authentication response to the server via a communications channel which bypasses the user computer.

A fourth aspect of the invention provides a computer program comprising program code means which, when loaded in a processor of an interface device for interfacing between a user computer and a security device, configures the interface device to perform a method for authenticating communications between the user computer and a server via a data communications network, the method including the steps of: (i) receiving from the user computer an authentication output containing an authentication message sent by the server to the user computer in use; (ii) extracting the authentication message from the authentication output; (iii) sending the authentication message to the security device; and, (iv) on receipt from the security device of an authentication response to the authentication message, sending the authentication response to the server via a communications channel which bypasses the user computer.

A fifth aspect of the invention provides an interface device for interfacing between a user computer and a security device, the interface device being adapted to authenticate communications between the user computer and a server via a data communications network, the interface device having: (i) a receiver adapted for receiving from the user computer an authentication output containing an authentication message sent by the server to the user computer in use; (ii) interface logic adapted for extracting the authentication message from the authentication output and for sending the authentication message to the security device; (iii) a communications interface being adapted to send, on receipt from the security device of an authentication response to the authentication message, the authentication response to the server via a communications channel which bypasses the user computer.

A sixth aspect of the present invention provides an intrusion detection method for a data communications system in which a security device, having memory containing security data, is adapted for data communications with a remote server via an interface device for communicating with the server via a first communications channel and is operative to communicate with the server via at least one further communications channel. The method includes the steps of: (i) sending an authentication message from the server to the security device using the first and the at lease one further channels in respective authentication communications; (ii) sending an authentication response generated from the security data by the security device to the server for mutual authentication thereof; (iii) detecting differences between authentication results from the communications using the first and the at lease one further channels; and (iv) identifying potentially compromised components of the data communications system based on the differences.

Thus, in embodiments of the present invention, authentication communications are performed using different ones of a plurality of communication channels between the security device and server. In an authentication communication, an authentication message is sent by the server to the security device which replies with an authentication response generated using the security data, allowing mutual authentication of the server and security device. Differences between authentication results obtained using the different channels are detected and used to identify potentially compromised system components. For example, an authentication result on one channel can indicate a possible intrusion while a good authentication result is obtained on another channel. The difference can then be attributed to those components of the first channel which are not common to the second channel. Note that such components can be anywhere in the communications system utilized for the authentication process.

Thus, not only does the multi-channel authentication facility in embodiments of the invention offer improved security in the authentication procedure, comparison of the authentication results can give information about intrusions anywhere in the system. Intrusion detection methods embodying the present invention can thus overcome the limitations of prior ID techniques, providing security in authentication communications and decreasing the likelihood that intrusions anywhere in the communications system go undetected.

Preferred embodiments provide more than two, and ideally multiple, communications channels between the security device and server for use in different authentication communications. In general, the set of available channels can include a variety of different logical and/or physical channels involving different hardware and/or software components whose integrity can be assessed by the intrusion detection process. Particular examples will be given below.

In preferred embodiments, the authentication communications using different channels can be performed in parallel and differences detected between the authentication results from the parallel communications. As an alternative or in addition, differences can be detected between authentication results from authentication communications performed at different times during a communications session with the server. The authentication communications using different channels can use the different channels for both or only one of the authentication message and response in the authentication exchange. That is, authentication communications whose results are compared can include those which use a common channel for one of the component message/response communications.

In general, the authentication results in which differences are detected can be results of authentication procedures at one or both of the security device and server. At the most basic level for instance, the results in question can simply be success or failure of an authentication procedure. That is, if the authentication process is successful on one channel but fails on a second, this difference can be taken to indicate potential compromise of components on the second channel. However, where an authentication procedure involves assessment of various parameters as discussed below, the authentication results utilized can be results of such individual or composite assessments. As a further example, where the authentication procedure involves determining some form of rating which can take different values for different authentication communications, then differences in rating values can be detected for the intrusion detection process. This will be described further below.

A seventh aspect of the invention provides a data communications system including: (i) a server; (ii) a first interface device operative to communicating data with the server via a first communications channel of the system; (iii) a security device having memory containing security data operative to communicate with the server via the first interface device and operative to communicate with the server via at least one further communications channel of the system; and (iv) intrusion detection logic; wherein the server and security device are operative to use the first and the at lease one further channels in authentication communications in which the server sends an authentication message to the security device and the security device sends an authentication response generated using the security data to the server for mutual authentication thereof; and wherein the intrusion detection logic is operative to detect differences between authentication results from the communications using the first and the at least one further channels and to identify potentially compromised components of the data communications system based on the differences.

In general, the interface device can be any device which interfaces between the security device and server in the first communications channel whether directly or via another device. In a typical scenario, the interface device is adapted as discussed earlier to interface between the security device and a user computer for communicating with the server over a data communications network. Here, therefore, the first communications channel is provided via the user computer and can involve user action to implement communications between the server and interface device, for example by typing or positioning the interface device to acquire an image displayed by the user computer as mentioned above. Other examples will be given below.

In general, the security device can be integrated in the interface device or provided separately of the interface device. For example, the security device can include a chip embedded in the interface device. Alternatively, for example, the security device can include a smart card, with or without contacts, for insertion in, or wireless communication with, a suitably adapted interface device such as a dedicated card-reader or mobile phone device. Also, the further communications channel to the server can be provided via a communications interface in the security device, the first interface device or in another device, in particular another interface device adapted for data communications with the security device. Embodiments of the system can of course include a plurality of such communications interfaces providing further communications channels to the server, and such a further communications channel can involve user action to implement the communications as described above.

An eighth aspect of the invention provides a server for a data communications system in which a security device, having memory containing security data, is adapted for data communications with the server via an interface device for communicating with the server via a first communications channel and is operative to communicate with the server via at least one further communications channel. The server is adapted: (i) to participate in authentication communications for mutual authentication of the server and security device using different ones of the first and the at least one further channels, the participation including sending an authentication message to the security device and receiving from the security device an authentication response generated by the security device using the security data; (ii) to detect differences between authentication results from the communications using different channels; and (iii) to identify potentially compromised components of the data communications system based on the differences.

A ninth aspect of the invention provides a computer readable article of manufacture tangibly embodying computer readable instructions for executing a computer implemented method for causing a server to perform an intrusion detection method in a data communications system wherein a security device, having memory containing security data, is adapted for data communications with the server via an interface device for communicating with the server via a first communications channel and is operative to communicate with the server via at least one further communications channel, the intrusion detection method including the steps of: (i) sending an authentication message from the server to the security device using the first and the at lease one further channels in respective authentication communications; (ii) sending an authentication response generated from the security data by the security device to the server for mutual authentication thereof; (iii) detecting differences between authentication results from the communications using the first and the at lease one further channels; and (iv) identifying potentially compromised components of the data communications system based on the differences.

A tenth aspect of the present invention provides an authentication apparatus for authenticating data communications with a remote server. The apparatus includes a security device which has a memory that contains security data and a security logic such that the logic is adapted to use the security data in authentication communications with the server to generate an authentication response to an authentication message received from the server. The apparatus further includes a first interface device adapted for data communications with the security device and adapted for data communications with the server via a first communications channel, at least one communications interface for communicating with the server via a second communications channel, and channel selection logic adapted to select one of the communications channels for authentication communications with the server in dependence on a security indicator associated with a communication from the server on the first communications channel. The channel selection logic is adapted to send the authentication response, generated by the security logic in the authentication communications, to the server via the selected communications channel.

Thus, authentication apparatus embodying this invention has at least one communications interface providing an additional communications channel to the server as well as the first communications channel via the interface device, and the channel selection logic can select which channel should be used in authentication communications. The channel to be used is selected in dependence on a security indicator associated with a communication from the server on the first communications channel. This provides a simple yet highly efficient mechanism allowing reliable authentication to be achieved by embodiments of the invention without disadvantages of prior systems. For example, where the interface device is adapted to interface between the security device and a user computer as in the scenario discussed above, the further communications channel can bypass the user computer. This channel can then be selected for use in authentication communications when required, whereby problems associated with compromise of the user computer can be avoided. In general, the selection of channels for authentication communications in dependence on the aforementioned security indicator allows communications with the server to be authenticated with a required degree of security, a different channel being selected when required for security reasons. This different channel may be used to respond to an authentication message received on the first channel, or to conduct a complete authentication procedure with the server, e.g. the initial authentication on commencement of communications or a repeat authentication at a later stage.

Overall, the embodiments of the invention provide a highly effective mechanism for improving authentication of data communications with a remote server.

In general, the interface device may be any device which interfaces between the security device and server in the first communications channel whether directly or via another device. In a typical scenario, the interface device is adapted to interface between the security device and a user computer as discussed above. Here, therefore, the first communications channel is provided via the user computer and may involve user action to implement communications between the server and interface device, for example by typing or positioning the interface device to acquire an image displayed by the user computer as mentioned above. Other examples will be given below.

In general, the security device could be integrated in the interface device or provided separately of the interface device. For example, the security device may comprise a chip embedded in the interface device. Alternatively, for example, the security device could comprise a smart card, with or without contacts, for insertion in, or wireless communication with, a suitably adapted interface device such as a dedicated card-reader or mobile phone device. Also, a the communications interface providing a further communications channel to the server may be provided, in general, in the security device, the first interface device, or another device, in particular another interface device adapted for data communications with the security device. The channel selection logic may thus be adapted to send the authentication response via a selected channel directly, by controlling operation of a local communications interface, or indirectly, by controlling an interface device to use the selected channel for the communication. Embodiments of the apparatus may of course include a plurality of the communications interfaces for a plurality of further communications channels to the server, and such a further communications channel could involve user action to implement the communications as described above.

While embodiments can be envisaged where the channel selection logic is provided in the first interface device, in preferred embodiments the security device includes the channel selection logic. The security indicator to which this logic is responsive to select the authentication communications channel may be associated directly or indirectly with the communication from the server on the first channel. For example, the security indicator could be dependent on data contained in the communication, in particular could comprise such data or be derived using such data, and/or could be determined by the channel selection logic in connection with the communication based on one or more parameters such as timing of the communication, communication frequency or elapsed time since a previous communication. The security indicator may be dependent on various data contained in the communication, such as IP address, transaction details, time information, or even at the most basic level an instruction from the server to use a further channel, and further examples will be given below. The communication with which the security indicator is associated could be an initial communication between the server and security device on establishment of a connection, with the authentication message and response being exchanged subsequently over the channel selected by the channel selection logic. As another example, the communication in question could be that sending the authentication message on connection via the first channel, whereby the authentication response is returned on the selected channel. Alternatively, the communication in question could be a communication during a session after an initial authentication process, a new authentication communication then being effected via the selected channel.

An eleventh aspect of the invention provides a method for authenticating data communications with a remote server. The method comprises, at a security device which has memory containing security data, which is adapted for data communications with an interface device for communicating with the server via a first communications channel, and which is operative to communicate with the server via at least one further communications channel: (i) selecting one of the first and further communications channels for authentication communications with the server in dependence on a security indicator associated with a communication from the server on the first communications channel; (ii) in response to an authentication message received from the server, using the security data to generate an authentication response; and (iii) sending the authentication response to the server via the selected communications channel.

A twelfth aspect of the invention provides a computer program comprising program code means for causing a processor of a security device, which is adapted for data communications with an interface device for communicating with a remote server via a first communications channel and which is operative to communicate with the server via at least one further communications channel, to perform a method for authenticating data communications with the server including the steps of: (i) selecting one of the first and further communications channels for authentication communications with the server in dependence on a security indicator associated with a communication from the server on the first communications channel; (ii) in response to an authentication message received from the server, using security data stored in memory of the security device to generate an authentication response; and (iii) sending the authentication response to the server via the selected communications channel.

A thirteenth aspect of the invention provides an authentication system including the authentication apparatus according to the tenth aspect of the invention, and a server adapted for data communications with the security device via each communications channel. The server is adapted to send the authentication message to the security device via a channel in the authentication communications and to receive the authentication response from the security device on the channel selected by the channel selection logic.

A fourteenth aspect of the invention provides a security device for use in authenticating data communications with a remote server. The security device includes memory containing security data, and security logic adapted to use the security data in authentication communications with the server to generate an authentication response to an authentication message received from the server, wherein the security device is adapted for data communications with an interface device for communicating with the server via a first communications channel. The security device is operative to communicate with the server via a second communications channel. The security device further includes channel selection logic which is adapted to select one of the communications channels for authentication communications with the server in dependence on a security indicator associated with a communication from the server on the first communications channel. The channel selection logic is further adapted to send the authentication response, generated by the security logic in the authentication communications, to the server via the selected communications channel.

A computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

In general, where features are described herein with reference to an embodiment of one aspect of the invention, corresponding features may be provided in embodiments of another aspect of the invention as appropriate.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for authenticating communication between a user computer and a server via a data communications network, the apparatus comprising:
    a security device having: a memory containing security data; and a security logic configured to use the security data to generate an authentication response to an authentication message received from the server in use;
    an interface device configured for data communication with the security device, the interface device having: a receiver configured to receive from the user computer an authentication output containing the authentication message sent by the server to the user computer in use; and an interface logic configured to extract the authentication message from the authentication output and to send the authentication message to the security device, the interface device configured to communicate with the server via a first communications channel; and
    a communications interface configured to connect to the server via a second communications channel bypassing the user computer, wherein one of the security device and interface device is configured to send the authentication response to the server via the communications channel;
    wherein the interface device is configured to interface between the security device and the user computer for communicating with the server via said first communications channel, and wherein said communications interface is configured for communicating with the server via the second communications channel which bypasses the user computer.

2. The apparatus according to claim 1, wherein at least one of the security logic and the interface logic is configured to send the authentication response to the server via the communications channel.

3. The apparatus according to claim 1, wherein the interface logic is configured to receive the authentication response from the security device.

4. The apparatus according to claim 1, wherein the receiver comprises: an image sensor configured to receive an authentication output image, the image sensor encoding the authentication message displayed by the user computer.

5. The apparatus according to claim 1, wherein the receiver comprises:
    a microphone configured to receive an auditory authentication output, the microphone configured to encode the authentication message generated by the user computer.

6. The apparatus according to claim 1, wherein the receiver comprises:
    an RF receiver configured to receive an RF authentication output, the RF receiver configured to encode the authentication message transmitted by the user computer.

7. An intrusion detection method for a data communications system in which a security device having memory containing security data is configured for data communications with a remote server via an interface device for communicating with the server via a first communications channel and is operative to communicate with the server via at least one further communications channel, the method comprising:
    sending an authentication message from the server to the security device using said first and said at least one further channels in respective authentication communications;
    sending an authentication response generated from the security data by the security device to the server for mutual authentication thereof;
    detecting differences between authentication results from said communications using said first and said at least one further channels;
    identifying potentially compromised components of said data communications system based on said differences; and
    interfacing by the interface device between the security device and a user computer for communicating with the server via said first communications channel, and wherein a communications interface is configured to communicate with the server via a second communications channel which bypasses the user computer.

8. The method according to claim 7, further comprising:
    performing said authentication communications using said first and said at least one further channels in parallel; and
    detecting differences between the authentication results from the parallel communications.

9. The method according to claim 7, further comprising:
    detecting differences between said authentication results from authentication communications performed at different times during a communications session with the server.

10. The method according to claim 7, wherein the step of detecting differences between authentication results is performed at the security device or at the server.

11. The method according to claim 7, wherein the step of detecting differences between authentication results is performed both at the server and the security device.

12. A data communications system, comprising:
    a server;
    a first interface device operative to communicating data with the server via a first communications channel of the system;
    a security device having memory containing security data operative to communicate with the server via the first interface device and operative to communicate with the server via at least one further communications channel of the system; and
    intrusion detection logic;
    wherein the server and security device are operative to use said first and said at least one further channels in authentication communications in which the server sends an authentication message to the security device and the security device sends an authentication response generated using said security data to the server for mutual authentication thereof;

wherein the intrusion detection logic is operative to detect differences between authentication results from said communications using said first and said at least one further channels and to identify potentially compromised components of the data communications system based on said differences; and wherein the first interface device is configured to interface between the security device and a user computer for communicating with the server via said first communications channel, and wherein a communications interface is configured to communicate with the server via a second communications channel which bypasses the user computer.

13. The system according to claim 12, wherein the first interface device communicates with the security device and a user computer for communicating via said first channel with the server over a data communications network.

14. The system according to claim 12, wherein the security device is operative to communicate with the server via each of the further channels.

15. The system according to claim 12, further comprising:
at least one further interface device adapted to communicate with the security device and operative to communicate with the server via said further communications channel.

16. The system according to claim 12, wherein the server and security device are adapted to perform said authentication communications using said first and said at least one further channel in parallel, and wherein the intrusion detection logic is adapted to detect differences between the authentication results from the parallel communications.

17. The system according to claim 12, wherein the intrusion detection logic is adapted to detect differences between said authentication results from authentication communications performed at different times during a communications session with the server.

18. An authentication apparatus for authenticating data communications with a remote server, the apparatus comprising:
a security device having memory containing security data, and a security logic configured to use the security data in authentication communications with the server to generate an authentication response to an authentication message received from the server;
a first interface device configured for data communications with the security device and configured for data communications with the server via a first communications channel;
at least one communications interface for communicating with the server via a second communications channel;
channel selection logic configured to select one of said communications channels for authentication communications with the server in dependence on a security indicator associated with a communication from the server on the first communications channel, the channel selection logic being configured to send said authentication response, generated by the security logic in said authentication communications, to the server via the selected communications channel;
an image sensor at the first interface device configured to receive an authentication output image, the image sensor encoding the authentication message displayed by a user computer;
a plurality of communications interfaces for communicating with the server via the second communications channel; and
wherein the first interface device is configured to interface between the security device and a user computer for communicating with the server via said first communications channel, and wherein said communications interface is configured for communicating with the server via the second communications channel which bypasses the user computer.

19. The apparatus as claimed in claim 18, wherein the security device includes said channel selection logic.

20. The apparatus as claimed in claim 18, wherein the first interface device includes a said communications interface for communicating with the server via the second communications channel.

21. The apparatus as claimed in claim 18, wherein the security device includes said communications interface for communicating with the server via the second communications channel.

22. A method for authenticating data communications with a remote server performed by a security device which has memory containing security data, the security device configured for data communications with an interface device for communicating with the server via a first communications channel, and which is operative to communicate with the server via a second communications channel, the method comprising:
selecting one of said first and second communications channels for authentication communications with the server in dependence on a security indicator associated with a communication from the remote server on the first communications channel;
in response to an authentication message received from the server, using said security data to generate an authentication response;
sending the authentication response to the server via the selected communications channel;
receiving an authentication output image by the interface device, the image sensor encoding the authentication message displayed by a user computer; and
interfacing by the interface device between the security device and a user computer for communicating with the server via said first communications channel, and wherein a communications interface is configured to communicate with the server via the second communications channel which bypasses the user computer.

* * * * *